United States Patent
Page et al.

(10) Patent No.: US 7,308,547 B2
(45) Date of Patent: Dec. 11, 2007

(54) APPARATUS AND METHOD FOR CONTROL OF WRITE FILTER

(75) Inventors: John M. Page, Colorado Springs, CO (US); Matthew Scott Keith, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 406 days.

(21) Appl. No.: 10/630,031

(22) Filed: Jul. 30, 2003

(65) Prior Publication Data

US 2005/0027957 A1 Feb. 3, 2005

(51) Int. Cl.
*G06F 12/00* (2006.01)
(52) U.S. Cl. ...................................... 711/163
(58) Field of Classification Search ................. 711/163
See application file for complete search history.

(56) References Cited

U.S. PATENT DOCUMENTS 4,811,293 A * 3/1989 Knothe et al. .............. 365/195
5,950,205 A * 9/1999 Aviani, Jr. ............... 707/103 R
6,327,584 B1 * 12/2001 Xian et al. ...................... 707/1
6,523,103 B2 * 2/2003 Page ........................... 711/173
2001/0032300 A1 * 10/2001 Olson ........................... 711/162
2003/0084194 A1 * 5/2003 Ryan ........................... 709/250
2003/0182500 A1 * 9/2003 Raves et al. ................. 711/113
2003/0221083 A1 * 11/2003 Hill et al. .................... 711/207

* cited by examiner

*Primary Examiner*—Matthew Kim
*Assistant Examiner*—Shane M Thomas

(57) ABSTRACT

A method of protecting memory locations in an embedded system using a write filter. The method includes the steps of starting a write filter that intercepts writes to the protected memory locations and stores the writes in a cache; starting a state machine with a change state and a normal state; upon starting the state machine, entering the change state when an indication is present that data needs to be persisted to the protected memory otherwise entering the normal state; in the normal state identifying critical writes to the protected memory and creating at least one update file containing the changes in such writes; and in the change state, applying the changes in the update file and rebooting the system in a manner that persists the changes to the protected memory.

15 Claims, 4 Drawing Sheets

APPARATUS AND METHOD FOR CONTROL OF WRITE FILTER

BACKGROUND OF THE INVENTION

Embedded systems, e.g. a computer that is a component in a larger system and relies on its own microprocessor, are becoming commonplace in many items. Embedded systems are being used in personal electronic items such as PDAs, inkjet printers, cell phones, and car radios. Embedded systems are also becoming critical components of many industrial devices such as test and measurement systems, including the AGILENT TECHNOLOGIES J6802A and J6805A Distributed Network Analyzers.

To meet this growing demand, operating system providers, such as MICROSOFT, provide embedded versions of their normal operating systems. One of the more recent offerings from MICROSOFT is WINDOWS XP EMBEDDED (referred to herein as XPE). Embedded systems, such as XPE, provide functionality that recognizes the nature of embedded systems. One of the most important functions is to protect critical data, such as the operating system from being corrupted.

Embedded systems, much like personal computer systems generally store data in memory and/or mass storage. Mass storage may comprise, for example, a variety of removable and non-removable storage drives such as hard drives and compact flash media. Memory and mass storage components may be classified, in one respect, as either persistent or non-persistent. A persistent component stores data between boots of a computer system, whereas a non-persistent component does not (i.e., data stored in a non-persistent component is flushed between boots). In today's computer systems, memory is largely comprised of non-persistent components, and mass storage is largely comprised of persistent components.

Regardless of whether a component is persistent or non-persistent, the data stored therein is subject to corruption due to power surges, hard power downs, viruses, and so on. Although corrupted data may be cleared from non-persistent components by rebooting, it is much more difficult to remove corrupted data from persistent components--especially when the persistent component is the hard drive which stores a computer system's operating system. Corruption of operating system files can lead to intermittent failures of a computer system, or even worse, prevent the computer system from booting.

To prevent the corruption of critical data stored in an embedded system, it is desirable to write-protect the memory storing the critical data. If data cannot be written or overwritten to the memory, it is less likely that the data already stored thereon will become corrupted. The aforementioned XPE provides an enhanced write filter which, when enabled, intercepts all writes to designated portions of memory and redirects such writes either to another portion of memory (generally termed a write cache, but in XPE termed an "overlay"). The writes are cached in the write cache and made available as part of the protected memory. This gives the appearance that the protected portion of memory is writable while maintaining the integrity of the protected memory.

With the write filter enabled, corruption of the protected memory may be prevented. However, when the protected memory contains the operating system, it is necessary to allow some critical writes to be persisted to the protected memory. One example of a critical write is the changing of the computer's IP address. The enhanced write filter provides the capability of committing, e.g. writing, the data in the overlays to the protected memory. This action is also referred to as persisting. However, the XPE enhanced write filter simply commits all the data in the overlays and, as such, is unable to distinguish between critical writes and non-critical potentially damaging writes. Further, in the context of an embedded system the XPE fails to provide a safe environment for persisting data contained in the overlays.

Accordingly, the present inventors have recognized a need for apparatus and methods for controlling a write filter.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
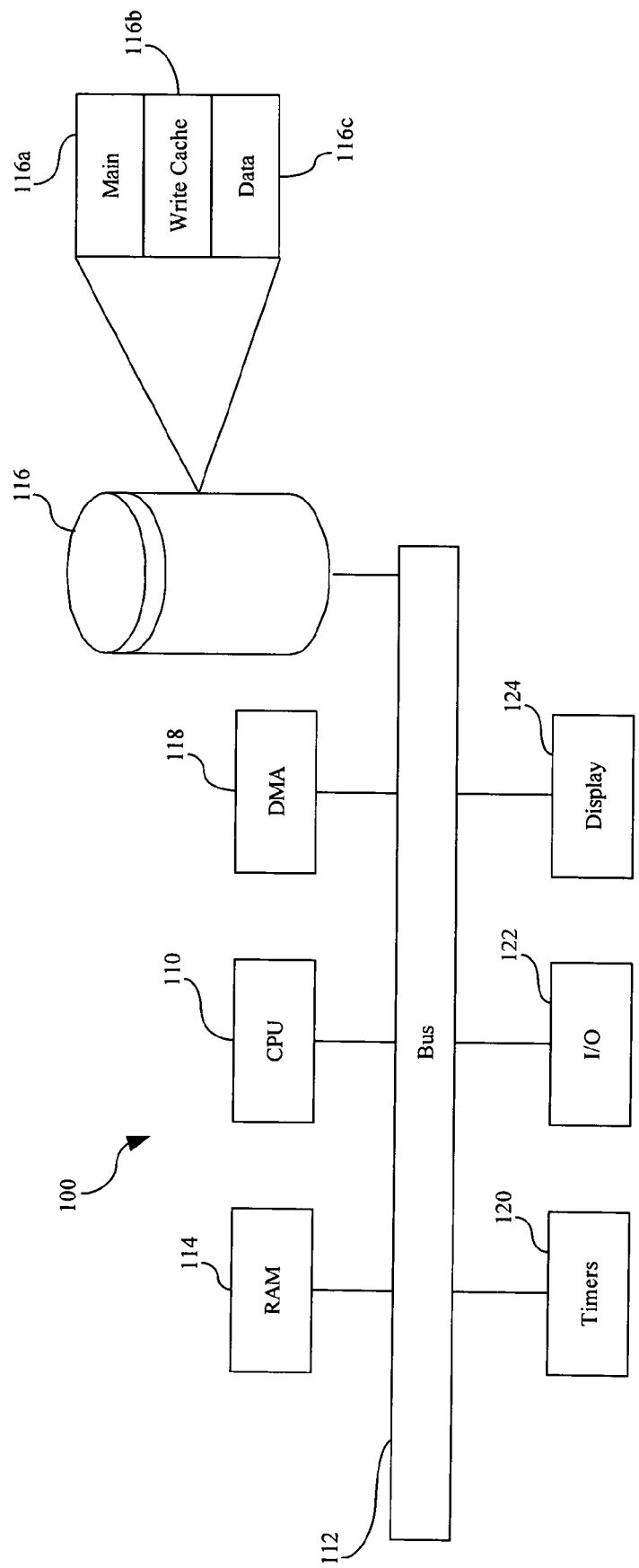
FIG. 1 is a block diagram of an embedded system in accordance with an embodiment of the present invention.

Reference will now be made in detail to the present invention, examples of which are illustrated in the accompanying drawings, wherein like reference numerals refer to like elements throughout. The detailed description which follows presents methods that may be embodied by routines and symbolic representations of operations of data bits within a computer readable medium, associated processors, embedded systems, general purpose personal computers and the like. The methods presented herein are sequences of steps or actions implemented by a processor leading to a desired result, and as such, encompasses such terms of art as "software," "routines," "computer programs," "programs," "objects," "functions," "subroutines," and "procedures." These descriptions and representations are the means used by those skilled in the art effectively convey the substance of their work to others skilled in the art.

The methods of the present invention will be described with respect to implementation on an embedded computer system using an embedded operating system. Those of ordinary skill in the art will recognize that the methods recited herein may also be implemented on a general purpose computer. More to the point, the methods presented herein are not inherently related to any particular device or operating system. Rather, various devices and operating systems may be used in accordance with the teachings herein. Machines that may perform the functions of the present invention include those manufactured by such companies as AGILENT TECHNOLOGIES, INC., and HEWLETT PACKARD as well as other manufacturers of embedded systems and general computing devices.

FIG. 1 is a block diagram of an embedded system 100 in accordance with an embodiment of the present invention.

The embedded system 100 generally comprises: a CPU 110 connected by a bus 112 to: RAM 114; disk storage 116; DMA (direct memory access) controller 118; timers 120; I/O subsystem 122; and a display subsystem 124. The disk storage 116 is divided into a plurality of partitions. In the example shown in FIG. 1, three partitions are provided. A main partition 116a stores the operating system and is protected by a write filter, such as the enhanced write filter used in XPE. A write partition 116b stores the data produced by a write filter. A data partition 116c is used to store applications and data and is not typically, but may be, protected by the write filter.

It is to be noted that the block diagram shown in FIG. 1 has been simplified to avoid obscuring the present invention. There are functional components that have been left out or conveniently combined with other functional components selected for inclusion in FIG. 1. Further, the block diagram shown in FIG. 1 is but one of many architectures upon which the present invention may be practiced. The architecture show in FIG. 1 is sometimes termed the "PC architecture" because it resembles an early personal computer. This architecture was chosen for describing the present invention, as it is universally recognizable to those of ordinary skill in embedded system design.

Figure 2:
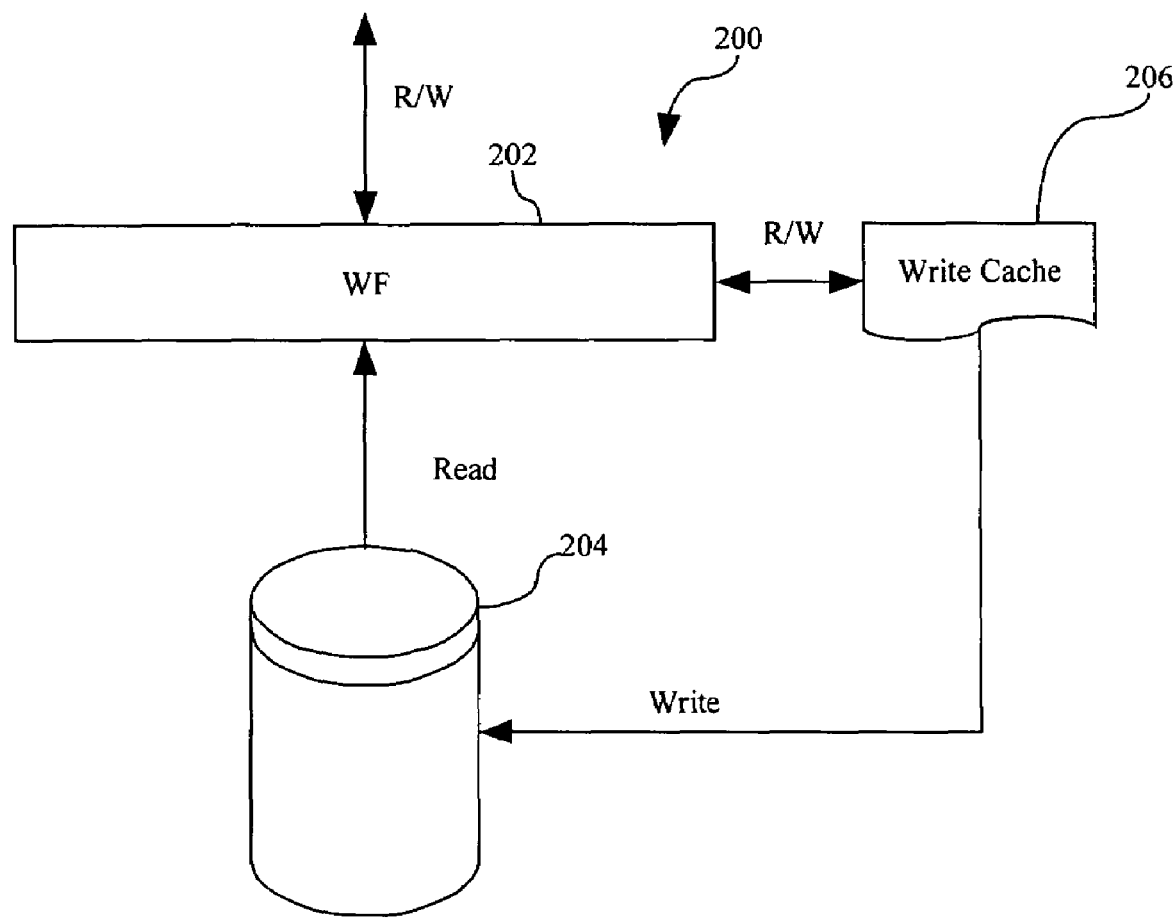
FIG. 2 is a block diagram of a write filter for use with an embedded system in accordance with an embodiment of the present invention.

FIG. 2 is a block diagram of a write filter system 200 for use with an embedded system in accordance with an embodiment of the present invention. The write filter system 200 protects memory location 204, sometimes called the protected memory, from writes. When using the enhanced write filter (EWF) included as part of XPE, the memory location 204 may be any volume, that is any partition of a local disk. EWF can also be used to protect non-writable media, i.e. CD-ROM, as a way of allowing non-persistent writes. The write filter (WF) 202 protects the contents of a volume by redirecting all writes to another storage location, the write cache 206, termed the overlay in XPE. The term "overlay" is used by XPE because the data stored in the write cache 206 functions similar to a transparency overlay on an overhead projector. Any change made to the overlay affects the picture as seen in the aggregate, but if the overlay were removed, the underlying picture remains unchanged. In this sense the term "overlay" refers to a collection of disk writes, which, when applied to a disk image, produces another disk image that represents a later state of the disk after the disk writes.

The WF 202 filters I/O operations to identify read/writes targeted at the protected memory 204. Any write to the protected memory 204 is redirected to the write cache 206. For reads targeted to the protected memory, the WF 202 determines if updated data corresponding to the requested data is stored in the write cache 206. If such updated data exists, the read request is satisfied with data retrieved from the write cache 206. Otherwise the read request is satisfied with data from the protected volume.

Operation of write filters, such as the WF 202, is typically controlled though an interface. For the MICROSOFT EWF, the interface is embodied in a system utility referred to an the enhanced write filter manager ("ewfmgr.exe"). While the MICROSOFT EWF provides for multiple levels of overlays, only one level is required for implementation of the present invention. TABLE 1 is a command description for "ewfmgr.exe" provided by MICROSOFT.

TABLE 1

EWFMGR <drive-letter>(optional) [options]
Parameters
drive-letter
Specifies the volume path. This is an optional parameter that is used for protected volume configuration mode. To view the status of the protected volume, specify the drive letter for the protected volume, for example, ewfmgr c:.
options
Specifies the EWF volume boot options.
For EWF volume configuration, use the Gauge command to display the percentage to which the EWF volume has been filled.
Use the following commands for protected volume configuration: Disable, Enable, Commit, SetLevel, Restore, Checkpoint, Description, and Nocmd.
Remarks
The following table lists the Enhanced Writer Filter (EWF) console manager application tool boot commands.
Boot command Description
All Displays information about all protected volumes and performs any specified commands, such as disable, enable, commit, checkpoint, and restore, on each volume.
Checkpoint Starts a new overlay level. Same as SetLevel= [Current Overlay Level + 1].
Commit Commits all current level data in the overlay to the protected volume, and resets the current overlay level to 1. Commit can be combined with the Disable command to commit and then disable.
CommitandDisable Commits all current level data in the overlay to the protected volume and disables the overlay.
Description Allows the user to associate an ASCII string with an overlay level. This command can be combined with the SetLevel command.
Disable Disables the overlay on the specified protected volume.
Enable Enables the write filter so that data written to the protected media is cached in the overlays. The current overlay level becomes 1 as soon as EWF is started, and a new overlay is created at level 1.
Gauge Displays the percentage to which the EWF volume has been filled.
NoCmd Clears the current pending command.
Persist Specifies a 64-byte field that persists throughout all overlays for a specific protected volume.
Restore Restores to the prior overlay. Same as SetLevel=[ Current Overlay Level − 1].
SetLevel Sets the current overlay level to the specified level. Valid values for levels are:
    [Current overlay level + 1]. Starts a new overlay level.
    [0 − Current overlay level]. Sets the level, discarding all data above the specified level.
    [− Level]. Deletes all the data in the specified level and beyond.
EWF manager commands are executed on the next boot, the system must be rebooted for the command to take effect.

Figure 3:
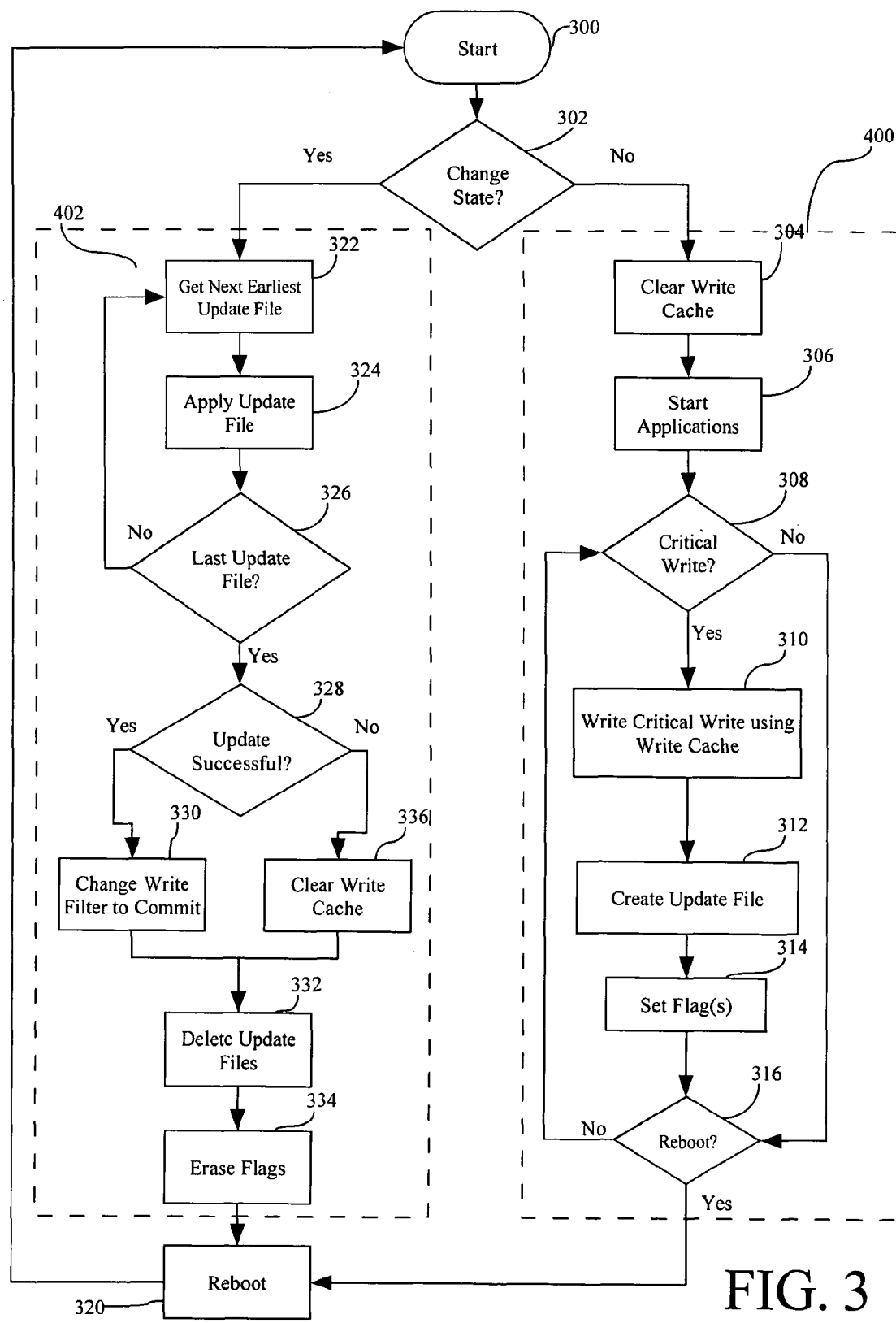
FIG. 3 is a flow chart of a method of using a write filter with an embedded system in accordance with an embodiment of the present invention.

FIG. 3 is a flow chart of a method of using a write filter with an embedded system in accordance with an embodiment of the present invention. The method shown in FIG. 3 can be implemented in software. Further, those of ordinary skill in the art will recognize that there exist a variety of platforms and languages for creating such software. The preferred embodiment of the present invention can be implemented using any of a number of varieties of C, however, those of ordinary skill in the art also recognize that the choice of the exact platform and language is often dictated by the specifics of the actual system constructed, such that what may work for one type of system may not be efficient on another system. It should also be understood that the methods described in this invention are not limited to being executed as software on a computer but can also be implemented in a dedicated hardware processor. For example, the routines and calculations could be implemented with HDL (Hardware Design Language) in an ASIC.

The method shown in FIG. 3 presumes the use of XPE, but as discussed above, the present invention is applicable to other embedded operating systems and may be implemented on general-purpose operating systems. The example shown in FIG. 3 is preferably, but not necessarily, embodied in an executable file, such as "autorun.exe" automatically invoked at startup as a service. The executable file may use an associated file, such as "autorun.ini," to store data regarding the operation of the autorun.exe file. In particular, the associated data file can be used to store the current state of autorun.exe.

In accordance with an embodiment of the present invention, the method shown in FIG. 3 is embodied as a state machine with two states: normal 400 and change 402. In the normal state 400, the embedded system executes the normal processes required thereof while critical files, such as the operating system are protected by a write filter which writes to a write cache. In the change state 402, a determination has been made that the critical files need updating and certain data in the write cache is persisted to the critical files.

The method starts in step 300, preferably invoked as one of the last steps in a boot process. In step 302, a check is made to determine whether entry into the change state 402 is desired. This can be done in any of a number of convention manners, the most typically being the use of flags. In perhaps the preferred embodiment, such flags comprise entries in the autorun.ini file identifying the location of data to be persisted.

Assuming that entry into the change state 402 is not required, the method enters the normal state 400 and proceeds to step 304 wherein a command to clear the write cache is given. With MICROSOFT's EWF, this is accomplished using the "ewfmgr.exe setlevel=0" which, upon the next startup, resets the level to 0 and clears all overlays. In effect, this causes the write cache to be cleared on the subsequent startup from each normal state. Any corrupted data resulting from an abnormal shut down is erased leaving the re-started system in a fresh state. Thereafter, in step 306, the applications of the embedded system are started. The term application, as used herein, designates computer programs designed to perform a specific task, such as network analysis, signal analysis, etc . . . . Applications can be distinguished from system software (also termed operating system, i.e. XPE) and system utilities. At this point the system is functioning normally performing the tasks for which it was designed.

In step 308, a determination is made as to whether a critical write to the protected memory areas has been requested. In the case of XPE, it is envisioned that most critical writes will be to the registry. The Registry is the centralized configuration database for XPE, as well as for the applications. The Registry stores information regarding tuning parameters, device configuration, and user preferences. The function and operation of the Registry is well documented and further discussion will be dispensed with. In the case of critical writes associated with a system update, discussed hereinafter, most of the critical write will be to files, and in particular system files or application files.

The determination that a critical write has been requested can be accomplished in a variety of manners. For example, the applications themselves can be programmed to be aware of such critical writes. By way of another example, a monitoring application can be created to intercept write requests and identify critical writes. Such a monitoring application may be more applicable to an embedded system that uses third party applications.

Once a request for critical write has been identified, the method proceeds to step 310 and the write is sent to the write filter for processing as normal. This typically involves the creation of an entry in the write cache (overlay in XPE) and the setting of appropriate pointers. Next in step 312, an update file is created on a non-write filtered partition. An update file stores the requested write for use in the change state. Among other benefits, the use of a file separate from the normal write cache, i.e. the overlay, facilitates the identification of critical writes versus writes that do not need to be persisted. In the case of writes to the Registry, the "RegSaveKey" system utility may be used to create a backup of the Registry key that was affected. The RegSaveKey system utility saves the specified key and all of its subkeys and values to a new file.

To prevent share type violations, where two or more aware applications are writing update files at the same time, a naming convention may be helpful. By way of example, such a convention could comprise a time stamp with additional counter digits. Thus, to generate a file name, the time would be retrieved from the system and four zeros appended thereto. A check is then made to determine if such a file already exists, and if so the counter digits are increased by one until no such file exists. Using such a convention will also facilitate the persisting of the write as described hereinafter.

Once the update file has been created, flags indicating the presence of critical writes requiring persistence are set in step 314. The term flag(s) is used in the general sense as anything that can serve to indicate of the presence of data that needs persistence. Such flags can comprise a register, the existence of an update file, or any other type of indication. It may prove preferable to simply write the file name of the update file into a section of a text file, such as the autorun.ini file.

In step 316, a check is made as to whether a reboot (or shutdown) has been requested. Depending on the nature of the critical write, it may be advisable to automatically force a shut down. This may be the case when the information contained in the critical write is not distributed to running applications until a reboot occurs. Alternatively, the method can simply wait for the user to request a reboot/shut down. If no reboot or shutdown is requested, the method returns to step 308 to see if additional critical writes have been requested.

Once a reboot/shutdown has been requested, the method proceeds to step 320 and system is then rebooted/shut down. Because the "ewfmgr.exe setlevel=0" command was issued in sep 304, the write cache is cleared as part of the subsequent startup.

Upon restarting the check made in step 302 will result in a change from the normal state 400 to the change state 402 and the method proceeds to step 322. In a departure from the normal state, applications are not invoked in the change state to avoid the possibility of corruption while persisting the critical updates. Rather the change state is reserved for the state machine and subsequent persisting of critical write that arise during the normal state.

In a loop comprising steps 322 to 326 all of the update files created during the last normal state are applied via the write cache. To that end, in step 322 the earliest update file is retrieved. In step 324, the retrieved update file is applied to the system. In the case of registry keys in XPE, this can be accomplished using the "RegRestoreKey" system utility. The RegRestoreKey system utility reads the registry information in a specified file and copies it over the specified key. As in the normal state, the write filter will intercept the writes and create the appropriate entries in the write cache. In step 326, a check is made as to whether there are any additional update files to process. If more files exist, the method returns to step 322 and the earliest remaining file is retrieved. As noted above, using a timestamp in the file name facilitates the identification of the earliest file.

Once all update files have been processed, the method proceeds to step 328 and a check is made to determine if the requested writes were successful. In most system, the write filter program issues errors that may be monitored. In XPE, the RegRestoreKey system utility also issues errors that may be monitored. If no errors occurred, the method proceeds to step 330 and the write filter is set to the commit mode. In XPE this can be accomplished using the "ewfmgr.exe commit" command. Thereafter in step 332, the update files are deleted. This can be streamlined by storing all update files in a single directory which can be batch erased. Next in step 334, the flags set in step 314, whatever their nature, are reset or erased. The method then proceeds to step 320 and the system is rebooted. Upon the next restart, the data in the write cache is persisted to the protected media, emptying the write cache. Subsequently, the system will enter the normal state 400 via step 302.

If in step 328, the update is determined to be unsuccessful, step 330 is skipped and the clear write cache command is given in step 336. Subsequently, in step 332, the update files are deleted. In step 334, the flags are erased. In this case, when the system is restarted, the configuration that existed at the start of the prior normal state is loaded thereby maintaining system stability. As know to those of ordinary skill in the art, additional routines could be implemented to determine the cause of the failure and attempts to rectify can be made.

Although an embodiment of the present invention has been shown and described, it will be appreciated by those skilled in the art that changes may be made in these embodiments without departing from the principles and spirit of the invention, the scope of which is defined in the claims and their equivalents.

For example, it is possible integrate an update process with the present invention. As is know in the art it is not uncommon for operating system providers to distribute update software for their operating system. Such updates can include security patches, bug fixes, and new features, including new system utilities. These updates are typically distributed as executable files, termed herein "update executable(s)." The update executable(s) may have data files associated therewith. As with the critical writes that occur during the normal state, it is useful to apply the updates contained in the update executable(s) in a change state where normal application are not running to reduce the risk of corruption.

Figure 4:
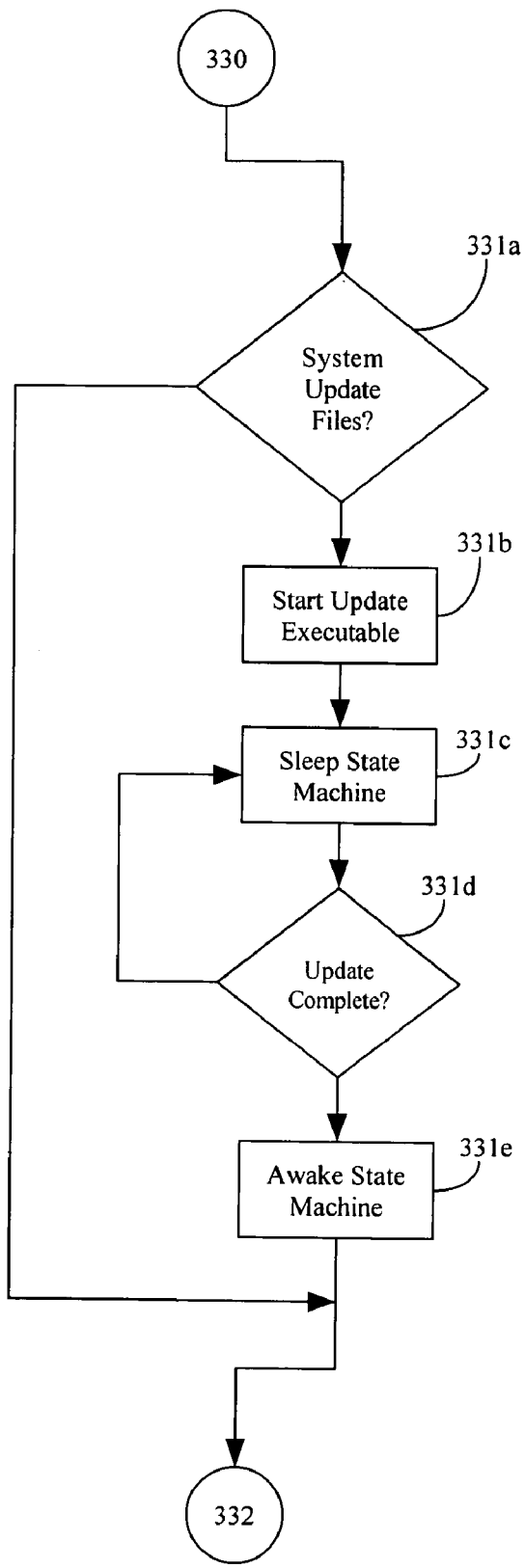
FIG. 4 is a flow chart of a method of updating an embedded system in accordance with an embodiment of the present invention.

FIG. 4 is a flow chart of a method of updating an embedded system in accordance with an embodiment of the present invention. The steps shown in FIG. 4 can be, but do not necessarily have to be, inserted between steps 330 and 332. During the normal state when an update executable needs to be executed, a flag can be set. For example, an entry in the autorun.ini file can be made pointing to the update executables. On reboot, a check is made in step 302 for such flags in addition to the check for critical write flags. The persisting of critical writes proceeds as normal through step 330. Thereafter, a check is made for the update executable flag in step 331a. Next, in step 331b, the update executable(s) are invoked. As with the application of the update files, the changes made by the update executables are intercepted by the write filter (where appropriate) and stored in the write cache.

It may be preferable to place the software implementing the state machine, i.e. "autorun.exe" in a sleep mode so as to avoid restarting the state machine based on a restart required for the update, of which there can be several. Thus, in step 331c, the state machine is placed in a sleep state. In step 331d, a check is made to determine if the update executables have completed. Once the update executable have completed, the state machine is awakened in step 331e.

Thereafter the method returns to step 332 in FIG. 3 and the update files (including, if desired, the update executables) are deleted. Subsequently, in step 334 all flags are erased, including those indicating the existence of update executables. Upon the reboot instigated in step 320 the writes occasioned by the update executable are persisted. The update process is somewhat different from the critical write situation discussed hereinabove in that the install data is written to an update executable file (with associated data files) and not applied to write filter during the normal state. When the change state is entered, the update executable(s) are run and any changes are persisted to disk.

What is claimed is:

1. A method of protecting memory locations associated with an embedded system, the method comprising:
   starting a state machine having at least a change state and a normal state;
   upon starting the state machine, entering the change state when an indication is present that data needs to be persisted to protected memory locations, otherwise entering the normal state;
   in both the change state and the normal state, starting a write filter that intercepts writes to the protected memory locations and stores the writes in a write cache;
   in the normal state, i) identifying requests for critical writes to the protected memory locations, ii) describing the critical writes in at least one update file stored in unprotected memory locations, but not persisting the critical writes to the protected memory locations, and iii) setting the indication that data needs to be persisted to the protected memory locations;
   in the change state, causing the critical writes described in the at least one update file to be persisted to the protected memory locations, and initiating a reboot of the embedded system; and
   before re-entering the change state or the normal state, rebooting the embedded system.

2. The method of claim 1, further comprising:
emptying the write cache upon reboot of the embedded system.

3. The method of claim 1, further comprising:
running applications of the embedded system in the normal state; and
not running the applications of the embedded system in the change state.

4. The method of claim 1, wherein the step of causing the critical writes described in the at least one update file to be persisted to the protected memory locations comprises:
clearing the write cache;
after clearing the write cache, applying the critical writes described in the at least one update file to the write filter, thereby causing the critical writes to be stored in the write cache; and then
issuing a command to persist the critical writes stored in the write cache to the protected memory locations.

5. The method of claim 4, further comprising, after successfully applying the critical writes described in the at least one update file to the write filters:
deleting the at least one update file; and
deleting the indication that data needs to be persisted to the protected memory locations.

6. The method of claim 1, wherein the step of setting the indication that data needs to be persisted to the protected memory locations comprises:
writing a file name of each update file to a data file.

7. The method of claim 1, wherein each update file is assigned a file name based on a time stamp.

8. The method of claim 1, further comprising:
in the change state, if an update executable exists executing said update executable.

9. The method of claim 8, further comprising:
putting the state machine in a sleep mode during the execution of the update executable.

10. An embedded system, comprising:
a processing unit responsive to an operating system for executing applications to perform functions of the embedded system;
a main memory location storing the operating system of the embedded system, said operating system providing a write filter that protects the operating system from writes;
a secondary memory location for storing software and data; and
a state machine that executes automatically upon boot of the embedded system and causes the embedded system to operate in either a normal state or a change state, wherein:
during operation in the normal state, i) the applications are run, and ii) when a critical write to the operating system is requested, the critical write is not persisted to the main memory location and an update file is generated in the secondary memory location, wherein the update file stores the critical write until the embedded system enters the change state; and
during operation in the change state, no applications are run and the update file is used to update and persist the critical write to the operating system;
wherein the operating system is configured to invoke the write filter in both the normal state and the change state.

11. An embedded system, comprising:
a processing unit;
a persistent component storing data between boots of the embedded system; and
a state machine stored in the persistent component and executable by the processing unit that, in conjunction with booting of the embedded system, assumes one of two states, the two states being,
a normal state in which applications are executed, in which a write filter intercepts writes to protected memory locations and redirects them to unprotected memory locations, in which the writes to the protected memory locations are not persisted to the protected memory locations, and in which critical writes to the protected memory locations are identified and described in at least one update file located in the unprotected memory locations; and
a change state, entered across a boot from the normal state, in which the write filter is cleared and critical writes described in the at least one update file are then applied to the write filter, in which the write filter causes the critical writes to be stored in a write cache, and in which the critical writes stored in the write cache are subsequently persisted to the protected memory locations.

12. The embedded system of claim 11, wherein the applications are not run during the change state.

13. The embedded system of claim 11, wherein the critical writes include writes to a system registry.

14. The embedded system of claim 11, wherein, during the change state, the critical writes update an operating system of the embedded system.

15. The embedded system of claim 11, wherein the protected memory locations store an operating system of the embedded system.

* * * * *

UNITED STATES PATENT AND TRADEMARK OFFICE
CERTIFICATE OF CORRECTION

PATENT NO. : 7,308,547 B2 Page 1 of 1
APPLICATION NO. : 10/630031
DATED : December 11, 2007
INVENTOR(S) : Page et al.

It is certified that error appears in the above-identified patent and that said Letters Patent is hereby corrected as shown below:

In column 9, line 21, in Claim 5, delete "filters:" and insert -- filter: --, therefor.

In column 10, line 19, in Claim 11, delete "executable" and insert -- executed --, therefor.

Signed and Sealed this

Third Day of June, 2008

JON W. DUDAS
*Director of the United States Patent and Trademark Office*